United States Patent
Li et al.

(10) Patent No.: US 10,059,632 B2
(45) Date of Patent: Aug. 28, 2018

(54) HUMIC ACID COMPOSITION AND APPLICATION THEREOF

(71) Applicant: SHANDONG TRALIN PAPER CO., LTD., Liaocheng (CN)

(72) Inventors: Hongfa Li, Liaocheng (CN); Mingxin Song, Liaocheng (CN); Liangjin Guo, Liaocheng (CN); Yanjin Bi, Liaocheng (CN)

(73) Assignee: SHANDONG TRALIN PAPER CO., LTD., Liaocheng (CN)

(*) Notice: Subject to any disclaimer, the term of this patent is extended or adjusted under 35 U.S.C. 154(b) by 0 days.

(21) Appl. No.: 15/331,013

(22) Filed: Oct. 21, 2016

(65) Prior Publication Data

US 2017/0129820 A1 May 11, 2017

(30) Foreign Application Priority Data

Nov. 5, 2015 (CN) .......................... 2015 1 0745968

(51) Int. Cl.

| C05F 11/02 | (2006.01) |
| C05G 3/04 | (2006.01) |
| C09K 17/14 | (2006.01) |
| C09K 17/16 | (2006.01) |
| C05D 1/00 | (2006.01) |

(Continued)

(52) U.S. Cl.
CPC ............... *C05F 11/02* (2013.01); *C05C 3/00* (2013.01); *C05D 1/00* (2013.01); *C05D 9/00* (2013.01); *C05G 3/04* (2013.01); *C09K 17/14* (2013.01); *C09K 17/16* (2013.01)

(58) Field of Classification Search
None
See application file for complete search history.

(56) References Cited

U.S. PATENT DOCUMENTS 3,264,084 A * 8/1966 Karcher .................... C05C 3/00
422/198
4,698,090 A * 10/1987 Marihart ................ A01N 61/00
71/24

(Continued)

FOREIGN PATENT DOCUMENTS

| CN | 101040622 A | 9/2007 |
| CN | 102850121 A | 1/2013 |

(Continued)

*Primary Examiner* — Wayne Langel
(74) *Attorney, Agent, or Firm* — Buchanan Ingersoll & Rooney PC

(57) ABSTRACT

A humic acid composition includes fulvic acid, ulmic acid and black humic acid. Fulvic acid is in an amount ranging from 64% to 98 wt % based on a sum weight of fulvic acid, ulmic acid and black humic acid. The content of phenol hydroxyl groups is in a range from 0.76 mmol/g to 2.42 mmol/g in the humic acid composition. The humic acid composition contains a high content of fulvic acid with small molecular weight and a high content of active functional groups, and a high content of phenolic hydroxyl in the active groups. The humic acid composition can provide microbial organic source for soil directly, and improve the nutrient of crops and the soil environment in rhizosphere to promote the breeding of microorganism and delay the attenuation rate of soil microbes.

20 Claims, 3 Drawing Sheets

(51) Int. Cl.
*C05D 9/00* (2006.01)
*C05C 3/00* (2006.01)

(56) References Cited

U.S. PATENT DOCUMENTS

| | | | | |
|---|---|---|---|---|
| 5,034,045 | A * | 7/1991 | Alexander | C05F 11/02 71/24 |
| 5,178,661 | A * | 1/1993 | van der Watt | C05F 11/02 71/24 |
| 5,451,240 | A * | 9/1995 | Trowbridge | C05D 9/00 71/24 |
| 6,783,567 | B1 * | 8/2004 | Waters | C05D 9/00 71/24 |
| 2003/0167811 | A1 * | 9/2003 | Porubcan | C05B 1/00 71/6 |
| 2004/0209320 | A1 * | 10/2004 | Newcomb | C08H 99/00 435/41 |
| 2010/0010089 | A1 * | 1/2010 | Van Dyke | C05F 11/02 514/568 |
| 2012/0279266 | A1 * | 11/2012 | Van Dyke | C05F 9/04 71/21 |
| 2016/0145162 | A1 * | 5/2016 | Kajita | C05F 11/02 71/24 |
| 2016/0229761 | A1 * | 8/2016 | Cherry | C05G 3/0094 |

FOREIGN PATENT DOCUMENTS

| | | |
|---|---|---|
| CN | 103275333 A | 9/2013 |
| CN | 103553817 A | 2/2014 |
| JP | 3-52989 * | 3/1991 |

* cited by examiner

US 10,059,632 B2

HUMIC ACID COMPOSITION AND APPLICATION THEREOF

FIELD OF THE INVENTION

The present invention relates to a fertilizer, in particular a humic acid composition and application thereof.

BACKGROUND OF THE INVENTION

Humic acid is a kind of organic matter with the properties of favorable biological activity, adsorption, chelation and exchange ect, which has an important application and development potentiality in agricultural production. The humic acid matter and the like can improve soil physicochemical property and utilization efficiency of a fertilizer, stimulates crop growth, strengthen anti-adversity of crop, and improve quality of agricultural product. The mainly content of humic acid is fulvic acid with high quality and good solubility. Fulvic acid is most active, strongest drought resisting and anti-adversity in humic acid. Fulvic acid can inhibit the dormancy of plant, make plant absorb constantly various nutrients, and enhance the physiological function of plant, so that it can be achieved to grow rapidly, optimize quality, and increase production. It is applicable to development of green agriculture without toxicity, pollution and nuisance, which makes the produced grain, vegetable, amphisarca etc. meet with the requirement of the green food, and is in favor of ecological environment and human health. In the past 30 years, fulvic acid is occupied a predominance in fertilizer for spraying on leaf surface and drought resistance agent. But fulvic acid is expensive and limited resources. Ulmic acid and black rotten acid exist extensively in weathered coal, brown coal, peat and so on, and the cost is cheap. But it induces scarcity of resources due to the exploitation of a large amount of coal resource.

CN103275333A discloses like-humic acid extract from crop straw and a method for preparing a compound fertilizer thereof. The resource utilization ratio is optimized by extracting humic acid and fulvic acid in rice straw. And the environment pollution caused by rice straw is reduced indirectly. Meanwhile, the production environment of crops can be improved by utilizing the compound fertilizer made from the like humic acid extract. The compound fertilizer provides with more nutrition for the growth of crops, and enhances the anti-adversity of crops.

CN101040622A discloses a method for preparing a humic acid composite for adjusting plant growth by plant straw. The method comprises: crushing and mixing at least one of corn straw, jowar straw, wheat straw and rice straw, disinfecting at 80~90° C. for 10~30 min, then cooling to 35-40° C., adding quick effective bacterial to ferment for 10-20 days, and obtaining an extractive solution. The solution of the invention can be stored for long time at normal temperature. In the invention, the product prepared by plant stem such as corn straw, jowar straw, wheat straw and rice straw as materials, has health-care function on plant. The invention can improve yield with significant social and economic benefits.

The fulvic acid or the humic acid solution with a certain concentration of potassium, sodium, and ammonium salt is applied in the crop at different bearing stages by seed soaking, dip in root, and sprinkling and so on. All the treatments can promote the growth of the crops, and accelerate the growing development of the crops. Thus, the output and quality of the crops are improved. The stimulation of the humic acid can make seed germination 2 to 3 days in advance, and the crops have a high germination rate, whole and strong seeding. And the humic acid has a special function on root system. In view of that, the humic acid is called "root system fertilizer". Besides the root, the humic acid also can promote the growth of the trophosome above the ground. It is noteworthy that the stimulation of the humic acid is especially important for the early growth stage of the crops. The humic acid contains phenol hydroxyl, quinonyl and the other active functional groups. Those functional groups promote the increase of enzymatic activity in plant, and increase the intensity of breath and photosynthesis, which is good for the synthesis of material, running, and accumulation.

It is shown in research that fulvic acid with lower molecular weight and higher content of active functional group is obviously higher promotion action than other humic acid with higher molecular weight. It may be that the action of humic acid on promoting the cell elongation is greater than the one on promoting the cell division, whereas, the action of fulvic acid on cell division is more obvious. In addition, humic acid contains phenol hydroxyl, carboxyl, alcohol hydroxyl reactive groups, ect. These active groups can interact with plant in different ways. And it is shown in research that the stimulating activity of humic acid is reduced by closing these groups, especially closing phenol hydroxyl. And saying is a lot about the action of functional groups. Schnitzer et al. consider that phenol hydroxyl plays a main role, not relevant to carboxyl according to the saying of closing groups.

Whereas, in prior art, the humic acid composition or fertilizer has lower stimulating activity on plants.

In view of that, the present invention is provided.

SUMMARY OF THE INVENTION

An object of the present invention is to provide a humic acid composition with reasonable components, which increases significantly microorganism quantity, promotes seed germination and have more stimulating activity on plant growth.

In order to achieve the object of the present invention, the following technical scheme is employed.

A humic acid composition, comprising fulvic acid, ulmic acid and black humic acid, wherein, fulvic acid is an amount ranging from 64% to 98 wt % based on a sum weight of fulvic acid, ulmic acid and black humic acid, preferably from 81% to 98 wt %, more preferably from 85% to 98 wt %; and a content of phenol hydroxyl groups is a range from 0.76 mmol/g to 2.42 mmol/g in the humic acid composition.

In one embodiment, the content of phenol hydroxyl groups is a range from 1.12 mmol/g to 2.21 mmol/g in the humic acid composition.

In one embodiment, a total content of acidic groups is a range from 0.76 mmol/g to 2.94 mmol/g in the humic acid composition, preferably a range from 1.12 mmol/g to 2.89 mmol/g.

A total humic acid is an amount ranging from 25 parts to 65 parts by weight of the humic acid composition, preferably from 25 to 55 parts by weight.

In one embodiment, organic material is an amount ranging from 35 parts to 55 parts by weight of the humic acid composition.

In one embodiment, insoluble matter is an amount ranging from 10 parts to 25 parts by weight of the humic acid composition.

In one embodiment, water-soluble matter is an amount ranging from 80 parts to 105 parts by weight of the humic acid composition.

In one embodiment, sodium ions are an amount ranging from 4.05 mmol/g to 4.85 mmol/g, or potassium ions are an amount ranging from 8.53 mmol/g to 11.23 mmol/g in the humic acid composition.

In one embodiment, sodium ions are an amount ranging from 0.20 mmol/g to 0.31 mmol/g, potassium ions are an amount ranging from 0.84 mmol/g to 1.43 mmol/g, and ammonium ions are an amount ranging from 3.57 mmol/g to 8.07 mmol/g in the humic acid composition.

Another object of the present invention is to provide a use of the humic acid composition in preparing a humic acid fertilizer, a soil amendment or a plant growth stimulin.

The humic acid composition is used to prepare the humic acid fertilizer, the soil amendment or the plant growth stimulin.

The following technical scheme of the invention is described in detail.

Humic acid with auxin activity can promote seed germination, which is similar to GA in activity. The function of humic acid for promoting seed germination is relevant to the adjustment of photosensitive pigment. And humic acid has the activity of the cytokinin, and the activity of abscisic acid on restraining the pore from opening and promoting the activity of the superoxide dismutase.

It is shown in research that fulvic acid with lower molecular weight and higher content of active functional group is obviously higher promotion action than other humic acid with higher molecular weight. It may be that the action of humic acid on promoting the cell elongation is greater than the one on promoting the cell division, whereas, the action of fulvic acid on cell division is more obvious.

In addition, humic acid contains phenol hydroxyl, carboxyl, alcohol hydroxyl reactive groups, ect. These active groups can interact with plant in different ways. And it is shown in research that the stimulating activity of humic acid is reduced by closing these groups, especially closing phenol hydroxyl. And saying is a lot about the action of functional groups. Schnitzer et al. consider that phenol hydroxyl plays a main role, not relevant to carboxyl according to the saying of closing groups. In the present invention, the humic acid composition is obtained by a large amount of tests. The content of fulvic acid with lower molecular weight and higher content of active functional groups is higher in the humic acid composition, and the content of phenolic hydroxyl groups is higher. The test shows that the action of the humic acid composition of the present invention is obvious on promoting seed germination.

The humic acid composition of the present invention comprises fulvic acid, ulmic acid and black humic acid, wherein, fulvic acid is an amount ranging from 64% to 98 wt % based on a sum weight of fulvic acid, ulmic acid and black humic acid, preferably from 81% to 98 wt %, more preferably from 85% to 98 wt %, and a content of phenol hydroxyl groups is a range from 0.76 mmol/g to 2.42 mmol/g in the humic acid composition.

In one embodiment, the content of phenol hydroxyl groups is a range from 1.12 mmol/g to 2.21 mmol/g in the humic acid composition.

In one embodiment, a total content of acidic groups is a range from 0.76 mmol/g to 2.94 mmol/g in the humic acid composition.

In another embodiment, the total content of acidic groups is a range from 1.12 mmol/g to 2.89 mmol/g in the humic acid composition.

In the present invention, a total quantity of the humic acid is a total weight of fulvic acid, ulmic acid and black rotten acid. A total humic acid is an amount ranging from 25 parts to 65 parts by weight of the humic acid composition, preferably from 25 to 55 parts by weight.

Further, organic material is an amount ranging from 35 parts to 55 parts by weight of the humic acid composition.

The organic matter in the present invention refers to an organic substance containing life function.

It is further detected about a content of water insoluble matter, solid matter, potassium ions, sodium ions and/or ammonium ions on the condition the humic acid composition being under solution state.

The water insoluble matter is an amount ranging from 10 parts to 25 parts by weight in the humic acid composition.

A water-soluble component is an amount ranging from 80 parts to 105 parts by weight in the humic acid composition.

The sodium ions are an amount ranging from 4.05 mmol/g to 4.85 mmol/g, or the potassium ions are an amount ranging from 8.53 mmol/g to 11.23 mmol/g in the humic acid composition.

The sodium ions are an amount ranging from 0.20 mmol/g to 0.31 mmol/g, the potassium ions are an amount ranging from 0.84 mmol/g to 1.43 mmol/g, and the ammonium ions are an amount ranging from 3.57 mmol/g to 8.07 mmol/g in the humic acid composition.

The total content of acidic groups is a range from 0.76 mmol/g to 2.94 mmol/g, and the content of phenolic hydroxyl groups is a range from 0.76 mmol/g to 2.42 mmol/g in the humic acid composition.

In one embodiment, the total content of acidic groups is a range from 1.12 mmol/g to 2.89 mmol/g, and the content of phenolic hydroxyl groups is a range from 1.12 mmol/g to 2.21 mmol/g in the humic acid composition.

Part of the acidic group of the humic acid combines with sodium ion, potassium ion, or ammonium ions to generate humic acid salt, and another part of the acidic group is free acidic group. In the present invention, the content of free acidic group in the humic acid composition is measured by the normal method in prior art. The total acidic groups refers to the free acidic groups in the humic acid composition, the carboxyl group refers to the free carboxyl group in the humic acid composition, and the phenol hydroxyl radical refers to the free phenol hydroxyl radical in the humic acid composition.

The acidic groups in the humic acid composition, for example phenolic hydroxyl radical, have the chelating ability with metal ions, which can greatly improve the biological effectiveness of metal ions. It is found that the amount of total acidic groups and phenol hydroxyl in humic acid composition affect the biological activity of the humic acid fertilizer. The humic acid composition of the present invention can chelate with metal cation to facilitate the absorption of the roots, and maintain moisture of the roots for dissolving inorganic fertilizer so as to reduce loss thereof. It is reduced that phosphorus react with calcium, iron, magnesium, and aluminum, or these elements are converted from the invalid state to absorbed state by the plant. And the toxic substances are reduced in soil. Therefore, physical and chemical properties of the soil are improved, and the fertilizer efficiency is increased, and original nutrients in the soil are activated, so that the growth environment of crops is improved. In addition, humic acid itself also has many bioactivities, such as improving the growth of crop root, enhancing crops' capability for absorbing, accumulating and transporting nutrients, enhancing respiration, improving the activity of the bio-enzyme, and improving the anti-adversity of plants. A flocculating precipitate does not appear after the humic acid composition of the present invention dissolves in water for 5 hours.

Furthermore, it is found that the humic acid composition also contains free acidic groups besides the acidic groups combining with potassium ion, sodium ion or other ions, which prolongs the acting time of the humic acid composition. Thus the fertilizer efficiency is released slowly, and a dynamic balance is kept according to the psychological need of crop. When the humic acid composition of the present invention is applied to acid soil, the free acidic groups chelate metal cation to facilitate the absorption of the roots, then the acid groups combining with sodium or potassium ions release gradually sodium or potassium ions, and are converted into the free acidic groups. The free acidic groups further chelate with metal cation to facilitate the absorption of the roots.

The humic acid composition in the present invention can not only be in the form of liquid but also solid, such as powder or graininess.

The present invention also provides a use of the humic acid composition in preparing a humic acid fertilizer, a soil amendment or a plant growth stimulin.

The humic acid composition in the present invention can be used to prepare humic acid fertilizer, soil amendment or the plant growth stimulin.

The humic acid fertilizer made from the humic acid composition of the present invention has reasonable components. The content of fulvic acid with small molecular weight and high content of active functional groups is high, and the content of phenolic hydroxyl is high, which promotes obviously seed germination. The humic acid fertilizer can provide soil microbial with organic sources directly, and improve the nutrient of corps and the soil environment in rhizosphere to promote the breeding of microorganism and delay the attenuation rate of soil microbes. Thus the soil microbes can keep exuberant life activities for a long time, so as to promote crop growth and development.

The humic acid composition can be prepared directly by mixing fulvic acid, ulmic acid and black humic acid according to a required ratio. Alternatively, The humic acid composition can be prepared by mixing fulvic acid, ulmic acid and black humic acid which are got by the method in the prior art according to the certain ratio of the present invention. Preferably, the humic acid composition of the present invention is prepared by the method of the present invention.

A method for preparing the humic acid composition comprising: dissolving lignin from plant straw in cooking solution under the condition of high temperature, and hydrolyzing lignin into fulvic acid, ulmic acid and the black humic acid with small molecules, wherein, the cooking solution is ammonium sulfite, sodium carbonate, alkaline sodium sulfite, sodium hydroxide or potassium hydroxide solutions.

Specifically, the method for preparing the humic acid composition comprising:

(1) stocking plant straw to get plant straw material;
(2) mixing the plant straw material with a cooking solution in a reactor, wherein, a liquid ratio is a range from 1:2.5 to 1:9.0;
(3) heating up to a temperature from 140° C. to 180° C. in the reactor and keeping the temperature for 40~180 min to obtain pulp liquid A;
(4) washing pulp liquid A to get a pulp and an extract;
(5) getting a concentrated solution from the extract by multi-effect evaporation, namely the concentrated solution is the humic acid composition;

Or getting the humic acid composition by pulp-spraying granulation after stirring the concentrated solution;

(6) applying the pulp in the step (4) to paper making, or to getting polysaccharide by enzymolysis.

The humic acid composition of the present invention can be in the form of liquid; or in the form of solid, such as powder or granule. Specifically, when the humic acid composition is a concentrated solution obtained by multi-effect evaporation, it is in the form of liquid. When the humic acid composition is a composition obtained by the concentrate solution spraying granulation, it is in the form of solid, such as granular. Or the humic acid composition is further is a composition obtained by atomizing the concentrate solution so it is in the fouls of powder state.

In step (2), adding a certain amount of liquid to meet the requirements of liquid ratio, wherein, the liquid can be the extract or water.

The term "extract", refers to a liquid obtained by extracting the fiber from pulp liquid prepared by fully reacting in the reactor.

The lignin in plant straw hardens the cell wall by forming weaving nets, so the lignin is located among the plant cellulose fibers. In the present invention, the cooking solution is infiltrated in the plant cell wall under the condition of high temperature, and reacts with lignin in the plant cell wall by suffocation or alkaline hydrolysis.

In step (2), the cooking solution is selected from ammonium sulfate, sodium carbonate solution, alkaline sodium sulfite and sodium hydroxide or potassium hydroxide solution.

When the ammonium sulfite solution is as the cooking solution, ammonium sulfite is an amount ranging from 15% to 25% by weight of absolute dry plant straw material.

When the sodium carbonate solution is as the cooking solution, sodium carbonate is an amount ranging from 18% to 30% by weight of absolute dry plant straw material.

When the potassium hydroxide solution is as the cooking solution, potassium hydroxide is an amount ranging from 13% to 25% by weight of absolute dry plant straw material, and the anthraquinone is an amount ranging from 0.06% to 0.1% by weight of absolute dry plant straw materials;

When the sodium hydroxide solution is as the cooking solution, sodium hydroxide is an amount ranging from 11% to 20% by weight of absolute dry plant straw material, and the anthraquinone is an amount ranging from 0.06% from 0.1% by weight of absolute dry plant straw materials.

When alkaline sodium sulfite solution is as the cooking solution, sodium sulfite is an amount ranging from 14% to 22% weight of absolute dry plant straw material, and the anthraquinone is an amount ranging from 0.05% to 0.2% by weight of absolute dry plant straw materials.

In step (3), the materials in the reactor are heated, by hot steam. Alternatively, the cooking solution is first extracted from the reactor, and then is heated up to 160~180° C. by using an external heater.

The process of stocking comprises: crushing the plant straw to obtain chopped straw with a length of 20 mm to 100 mm, and a pass rate of 92% or more; washing the chopped straw for removing the mud; dehydrating the chopped straw to a content of the absolute dry straw material of more than 15%, and feeding the chopped straw into a screw feeder to compress and dehydrate continuously to a content of the absolute dry straw materials of 35~45%.

After exchanging heat with water with the normal temperature to 75~80° C., and the extract is made into the humic acid composition by multi-effect evaporation or further spray granulation.

The concentrated solution with a content of the solid matter of 50-65% and a temperature from 100° C. to 110° C. is obtained from the extract by multi-effect evaporation, which is the humic acid composition in form of liquid. Or the humic acid composition further is a composition in the form of granulation obtained from the concentrated solution by spraying granulation.

In the present invention, the plant straw is hydrolyzed by the cooking solution, and the lignin in the plant straw is hydrolyzed into the humic acid composition with high content of humic acid. The humic acid composition contains a lot of essential elements or trace elements being beneficial to plant growth. The humic acid composition can be made into a composition that is suitable for different plant growth or areas. Lots of cellulose and semi-cellulose in the solid residue are obtained by after hydrolyzing the plant straw, which can be used for paper-making, or preparation of fermentable sugars.

In the present invention, the reactor included but not limited to the ball steamer, vertical steamer, horizontal continuous steamer, vertical continuous steamer or reaction kettle, etc.

Compared with the prior arts, the advantage of the present invention is as followed:

(1) The humic acid composition has the reasonable components, contains high content of fulvic acid with small molecular weight and high content of active functional groups, and high content of phenolic hydroxyl in the active groups. So the humic acid composition takes an obvious effect on promoting seed germination.

(2) The humic acid composition can provide microbial organic source for soil directly, and improve the nutrient of crops and the soil environment in rhizosphere to promote the breeding of microorganism and delay the attenuation rate of soil microbes. Thus, the soil microbes can be kept exuberant life activities for a long time, so as to promote the growth and development of crops.

EMBODIMENTS

Specific embodiments of the invention are further described in detail hereinafter, but not limiting the present invention.

Embodiment 1

(1) crushing wheat straw to get a chopped straw with a length of 20-60 mm, washing the chopped straw for removing the mud, dehydrating the chopped straw to a content of the absolute dry straw material of more than 15%, and feeding the chopped straw into a screw feeder to compress and dehydrate continuously to a content of the absolute dry straw materials of 35~45% to obtain plant straw material;

(2) feeding the plant straw material in step (1) into a vertical continuous steamer, adding ammonium sulfite solution and mixing with the plant straw material, wherein, ammonium sulfite is an amount of 18% by weight of absolute dry straw material; adding an extract up to a liquid ratio of 1:7.5;

(3) heating up to a temperature 175° C. in the vertical continuous steamer, and keeping the temperature for 120 min to obtain pulp liquid A;

(4) blowing the pulp liquid A to a blow bin, passing a squeezing pulp machine and a vacuum pulp washer for washing and replacing to get a pulp and the extract;

(5) obtaining a concentrated solution with a content of solid matter of 55% and a temperature of 100~110° C. from the extract by multi-effect evaporator, and getting the humic acid composition by pulp-spraying granulation after stirring the concentrated solution;

(6) applying the pulp in step (4) to paper making, or to getting polysaccharide by enzymolysis.

Figure 1:
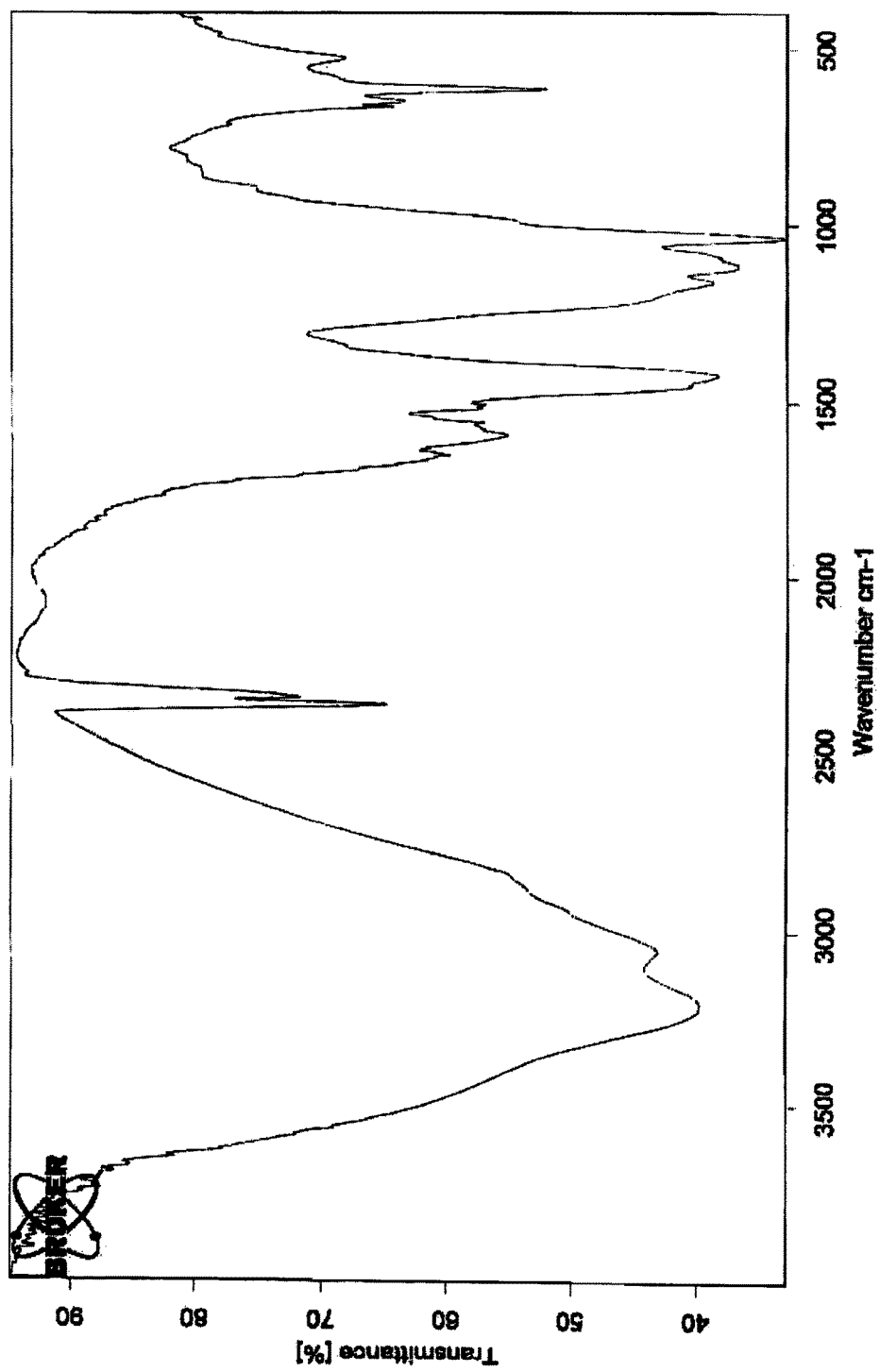
FIG. 1 is infrared spectrogram of the humic acid composition from wheat straw in embodiment 1.

Infrared spectrum of the humic acid composition in the embodiment is shown in FIG. 1. The humic acid composition in the embodiment is measured, in which a content of fulvic acid is 44.62 parts by weight, a content of ulmic acid is 4.6 parts by weight, a content of black humic acid is 0.81 parts by weight, and the total content of the humic acid is 50.03 parts by weight. The humic acid composition comprises a total of acidic groups of 2.12 mmol/g, carboxyl group of 0.31 mmol/g, phenolic hydroxyl group of 1.81 mmol/g, potassium ions of 1.29 mmol/g, ammonium ions of 8.07 mmol/g, and sodium ions of 0.31 mmol/g.

Embodiment 2

(1) crushing rice straw to get a chopped straw with a length of 60 mm, washing the chopped straw for removing the mud, dehydrating the chopped straw to a content of the absolute dry straw material of more than 15%, and feeding the chopped straw into a screw feeder to compress and dehydrate continuously to a content of the absolute dry straw materials of 35~45% to obtain plant straw material;

(2) feeding the plant straw material in step (1) into a horizontal continuous steamer, adding potassium hydroxide and anthraquinone and mixing with the plant straw material, wherein, potassium hydroxide is an amount of 22% by weight of absolute dry straw material, and anthraquinone is an amount of 0.06% by weight of absolute dry straw material; adding water up to a liquid ratio of 1:3;

(3) heating up to a temperature 155° C. in the horizontal continuous steamer, and keeping the temperature for 20 min to obtain pulp liquid A;

(4) blowing the pulp liquid A to a blow bin, passing a squeezing pulp machine and a vacuum pulp washer for washing and replacing to get a pulp and the extract;

(5) obtaining a concentrated solution with a content of the solid matter of 55% and a temperature of 100~110° C. from the extract by multi-effect evaporator, and getting the humic acid composition by pulp-spraying granulation after stirring the concentrated solution;

(6) applying the pulp in step (4) to paper making, or to getting polysaccharide by enzymolysis.

Figure 2:
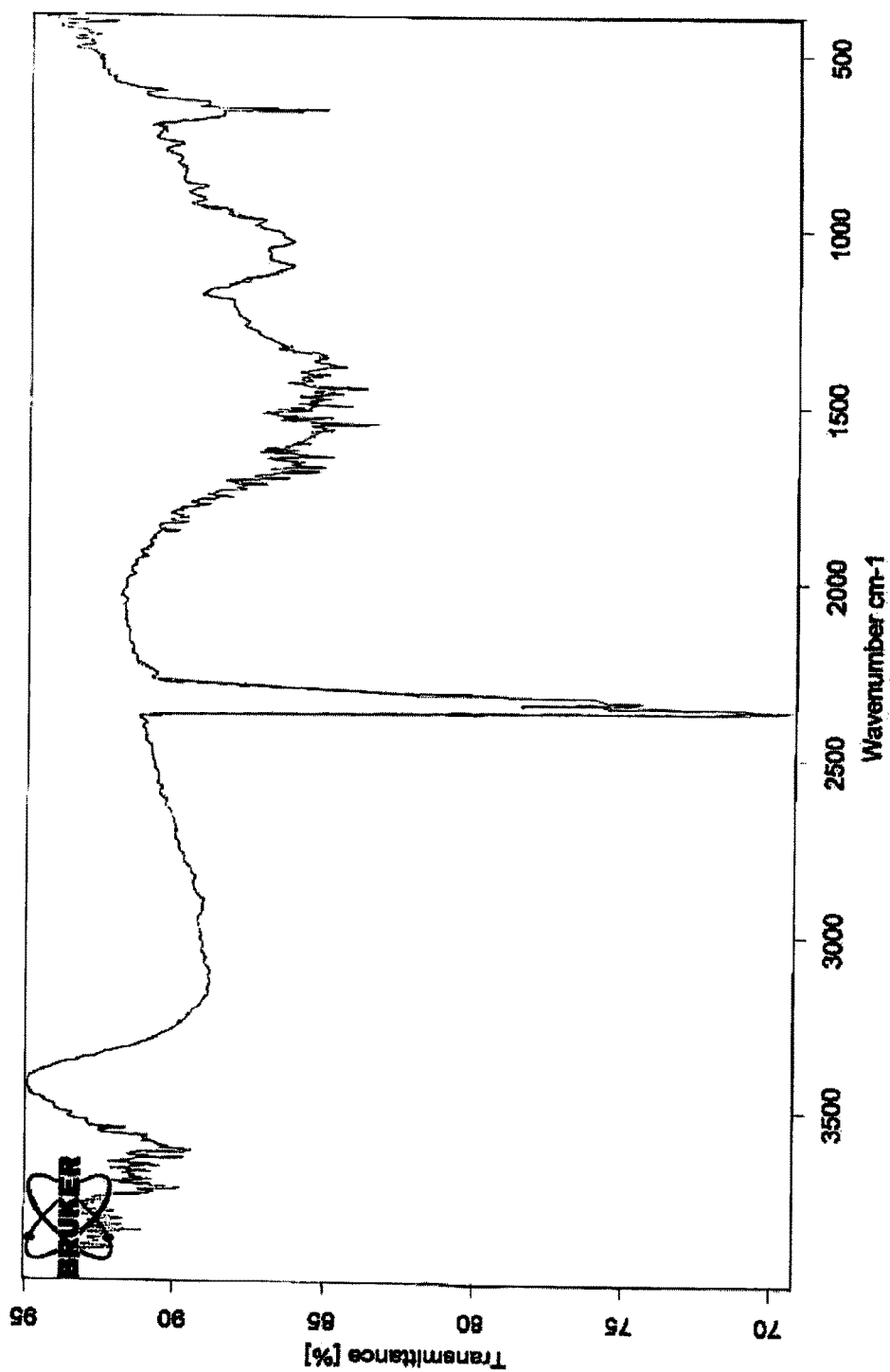
FIG. 2 is infrared spectrogram of the humic acid composition from rice straw in embodiment 2.

Infrared spectrum of the humic acid composition in the embodiment is shown in FIG. 2. The humic acid composition in the embodiment is measured, in which a content of fulvic acid is 30.20 parts by weight, a content of ulmic acid is 1.5 parts by weight, a content of black humic acid is 5.97 parts by weight, and the total content of the humic acid is 38.67 parts by weight. The humic acid composition comprises total acidic groups of 0.95 mmol/g, carboxyl group of 0 mmol/g, phenolic hydroxyl group of 0.95 mmol/g, and potassium ions of 9.76 mmol/g.

Embodiment 3

(1) crushing corn straw to get a chopped straw with a length of 20-100 mm, removing the dust from the chopped straw by dry method to obtain plant straw material;

(2) feeding the plant straw material in step (1) into a ball steamer, adding sodium carbonate and anthraquinone and mixing with the plant straw material, wherein, sodium carbonate is an amount of 18% by weight of absolute dry straw material, and anthraquinone is an amount of 0.06% by weight of absolute dry straw material; adding an extract up to a liquid ratio of 1:3;

(3) heating up to a temperature 160° C. in the ball steamer, and keeping the temperature for 120 min to obtain pulp liquid A;

(4) blowing the pulp liquid A to a blow bin, passing a squeezing pulp machine and a vacuum pulp washer for washing and replacing to get a pulp and the extract;

(5) obtaining a concentrated solution with a content of solid matter of 55% and a temperature of 100~110° C. from the extract by multi-effect evaporator, and getting the humic acid composition by pulp-spraying granulation after stirring the concentrated solution;

(6) applying the pulp in step (4) to paper making, or to getting polysaccharide by enzymolysis.

Figure 3:
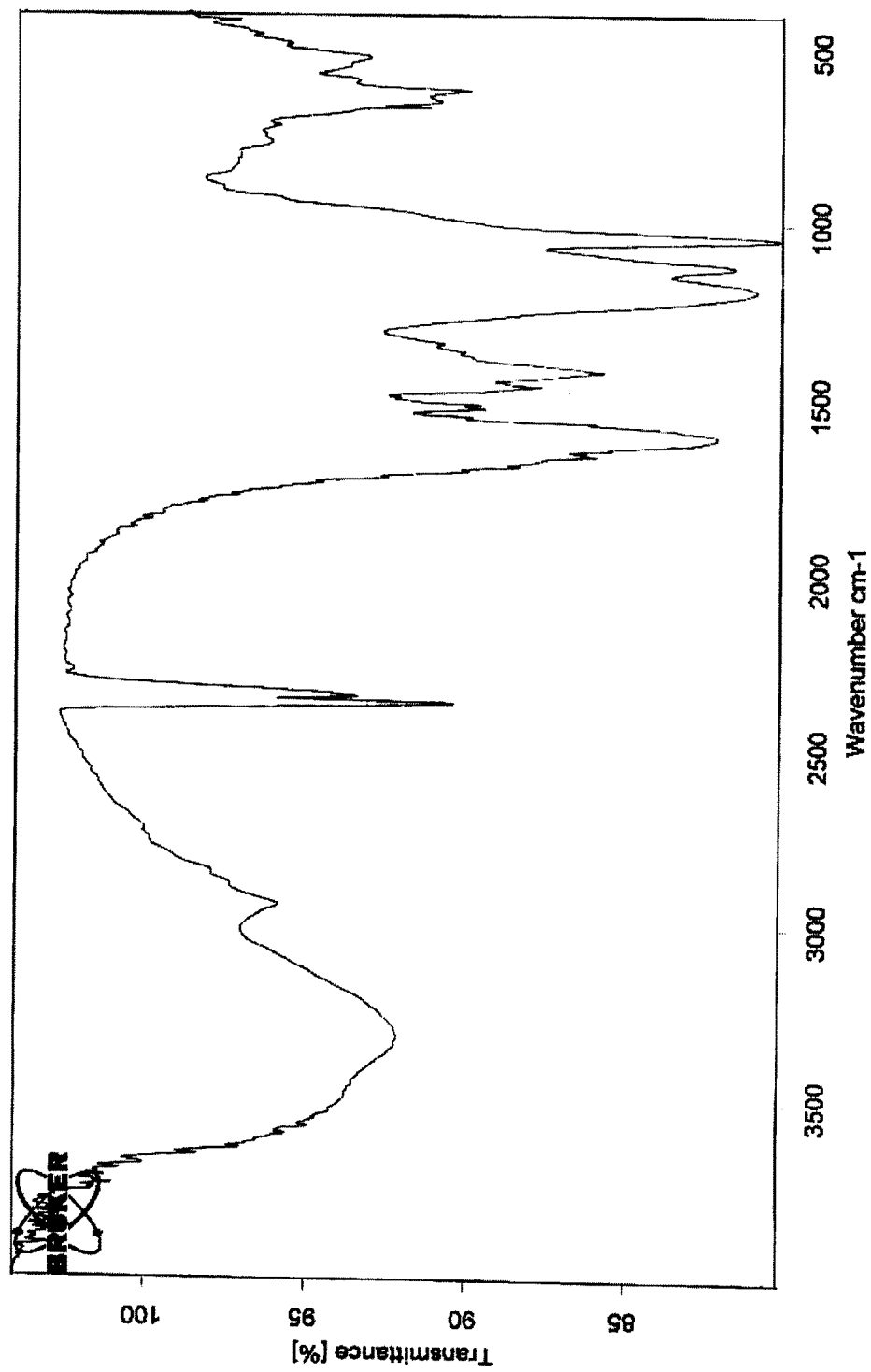
FIG. 3 is infrared spectrogram of the humic acid composition from corn stalk in embodiment 3.

Infrared spectrum of the humic acid composition in the embodiment is shown in FIG. 3. The humic acid composition in the embodiment is measured, in which a content of fulvic acid is 54.32 parts by weight, a content of ulmic acid is 0.74 parts by weight, a content of black humic acid is 0.54 parts by weight, and the total content of the humic acid is 55.6 parts by weight. The humic acid composition comprises total acidic groups of 2.17 mmol/g, carboxyl group of 0.19 mmol/g, phenolic hydroxyl group of 1.98 mmol/g, and sodium ions of 4.64 mmol/g.

Embodiment 4

(1) stocking wheat straw to get a chopped straw with a length of 20-60 mm and a qualification rate of less than 92% by dry method, then wetly rubbing, washing the cropped straw, and dehydrating the chopped straw to a content of the absolute dry straw material of 18% to obtain plant straw material;

(2) compressing and dehydrating the plant straw material to a content of the absolute dry straw materials of 40% to obtain plant straw material as dehygrated;

(3) feeding the straw raw material obtained in step (2) to a vertical steamer; adding sodium carbonate solution and a black liquid with a temperature of 90° C., and adding a hot black liquid with a temperature of 150° C. into the vertical steamer, wherein, liquid ratio is 1:13, and sodium carbonate is an amount of 22% by weight of the absolute dry straw material; heating quickly and circularly a cooking liquor up to a temperature of 145° C. by a heater after the hot black liquid being fed into the vertical steamer, and keeping the temperature of 145° C. for 80 minutes under a pressure of 0.45 MPa at a top of the vertical steamer; discharging the hot black liquid and getting an intermediate pulp, wherein the hot black liquid as discharged enters into a tank for feeding circularly into the vertical steamer;

(4) washing the intermediate pulp with a cold black liquid with a temperature of 75° C. to get a washed intermediate pulp; blowing the washed intermediate pulp to a squeezing pulp machine and a vacuum pulp washer for washing and replacing to get a dense pulp and a warm black liquid; after exchanging the heat of the warm black liquid, adding the black liquid and a cooking solution into the vertical steamer to proceed to step (3) circularly; and defibering the dense pulp to obtain a pulp.

In a black liquid from the process of washing the intermediate pulp, a content of fulvic acid is 15 g/L, a content of ulmic acid is 10 g/L, a content of black humic acid is 5 g/L, the total content of humic acid is 30 g/L, a content of organic matter is 38 g/L, a content of the water-insoluble component is 16 g/L, a content of the solid matter is 80 g/L, and a content of sodium ions is 8.0 g/L. The humic acid composition of the present invention is got by evaporation and pulp-spraying granulation.

The humic acid composition in the embodiment is measured, in which a content of fulvic acid is 15 parts by weight, a content of ulmic acid is 10 parts by weight, a content of black humic acid is 5 parts by weight, the total content of the humic acid is 30 parts by weight, and a content of organic matter is 38 parts by weight. The humic acid composition comprises total acidic groups of 1.00 mmol/g, carboxyl group of 0.1 mmol/g, and phenolic hydroxyl group of 0.9 mmol/g.

Embodiment 5

(1) stocking wheat straw to get a chopped straw with a length of 20-60 mm and a qualification rate of less than 92% by dry method, then wetly rubbing, washing the cropped straw, and dehydrating the chopped straw to a content of the absolute dry straw material of 18% to obtain plant straw material;

(2) compressing and dehydrating the plant straw material to a content of the absolute dry straw materials of 40% to obtain plant straw material as dehygrated;

(3) feeding the straw raw material obtained in step (2) to a vertical steamer; adding sodium carbonate solution and a black liquid with a temperature of 90° C., and adding a hot black liquid with a temperature of 150° C. into the vertical steamer, wherein, liquid ratio is 1:10, and sodium carbonate is an amount of 15% by weight of the absolute dry straw material; heating quickly and circularly a cooking liquor up to a temperature of 140° C. by a heater after the hot black liquid being fed into the vertical steamer, and keeping the temperature of 145° C. for 80 minutes under a pressure of 0.45 MPa at a top of the vertical steamer; discharging the hot black liquid and getting an intermediate pulp, wherein the hot black liquid as discharged enters into a tank for feeding circularly into the vertical steamer;

(4) washing the intermediate pulp with a cold black liquid with a temperature of 75° C. to get a washed intermediate pulp; blowing the washed intermediate pulp to a squeezing pulp machine and a vacuum pulp washer for washing and replacing to get a dense pulp and a warm black liquid; after exchanging the heat of the warm black liquid, adding the black liquid and a cooking solution into the vertical steamer to proceed to step (3) circularly; and defibering the dense pulp to obtain a pulp.

In a black liquid from the process of washing the intermediate pulp, a content of fulvic acid is 35 g/L, a content of ulmic acid is 6 g/L, a content of black humic acid is 1 g/L, the total content of humic acid is 42 g/L, a content of organic matter is 45 g/L, a content of water insoluble matter is 20 g/L, a content of the solid matter is 90 g/L, and a content of sodium ions is 10.5 g/L. The humic acid composition of the present invention is got by evaporation and pulp-spraying granulation.

The humic acid composition in the embodiment is measured, in which a content of fulvic acid is 35 parts by weight, a content of ulmic acid is 6 parts by weight, a content of black humic acid is 1 part by weight, the total content of the humic acid is 42 parts by weight, and a content of organic matter is 45 parts by weight. The humic acid composition comprises total acidic groups of 2.89 mmol/g, carboxyl group of 0.68 mmol/g, and phenolic hydroxyl group of 2.21 mmol/g.

Embodiment 6

(1) wetting a treated bagasse by depithing in a mode of spray, and entering into a extrusion screw, to get bagasse material;

(2) feeding the bagasse material in step (1) to a horizontal continuous steamer, adding sodium hydroxide and anthraquinone and mixing with the bagasse material, wherein, sodium hydroxide is an amount of 22% by weight of absolute dry straw material, and anthraquinone is an amount of 0.06% by weight of absolute dry straw material; adding water up to a liquid ratio of 1:3;

(3) heating up to a temperature 155° C. in the horizontal continuous steamer, and keeping the temperature for 20 min to obtain pulp liquid A;

(4) blowing the pulp liquid A to a blow bin, passing a squeezing pulp machine and a vacuum pulp washer for washing and replacing to get a pulp and the extract;

(5) obtaining a concentrated solution with a content of the solid matter of 55% and a temperature of 100~110° C. from the extract by multi-effect evaporator, and getting the humic acid composition by pulp-spraying granulation after stirring the concentrated solution;

(6) applying the pulp in step (4) to paper making, or to getting polysaccharide by enzymolysis.

The humic acid composition in the embodiment is measured, in which a content of fulvic acid is 38 parts by weight, a content of ulmic acid is 7 parts by weight, a content of black humic acid is 2 parts by weight, the total content of the humic acid is 47 parts by weight, and a content of organic matter is 45 parts by weight. The humic acid composition comprises total acidic groups of 2.89 mmol/g, carboxyl group of 0.68 mmol/g, phenolic hydroxyl group of 2.21 mmol/g.

Embodiment 7

(1) wetting a treated bagasse by depithing in a mode of spray, and entering into a extrusion screw, to get bagasse material;

(2) feeding the bagasse material in step (1) to a horizontal continuous steamer, adding potassium hydroxide and anthraquinone and mixing with the bagasse material, wherein, potassium hydroxide is an amount of 22% by weight of absolute dry straw material, and anthraquinone is an amount of 0.06% by weight of absolute dry straw material; adding water up to a liquid ratio of 1:3;

(3) heating up to a temperature 155° C. in the horizontal continuous steamer, and keeping the temperature for 20 min to obtain pulp liquid A;

(4) blowing the pulp liquid A to a blow bin, passing a squeezing pulp machine and a vacuum pulp washer for washing and replacing to get a pulp and the extract;

(5) obtaining a concentrated solution with a content of the solid matter of 55% and a temperature of 100~110° C. from the extract by multi-effect evaporator, wherein, the concentrated solution is the humic acid composition.

The humic acid composition in the embodiment is measured, in which a content of fulvic acid is 43.1 g/L, a content of ulmic acid is 6.1 g/L, a content of black humic acid is 0.4 g/L, a content of the total acidic groups is 0.95 mmol/g, a content of carboxyl group is 0.02 mmol/g, and a content of phenolic hydroxyl group is 2.22 mmol/g.

Further, the humic acid composition is obtained by pulp-spraying granulation after stirring the concentrated solution. In the humic acid composition, a content of fulvic acid is 43.1 parts by weight, a content of ulmic acid is 6.1 parts by weight, a content of black humic acid is 0.4 parts by weight, a total of acidic groups is 2.24 mmol/g, carboxyl group is 0.22 mmol/g, and phenolic hydroxyl group is 2.22 mmol/g.

(6) applying the pulp in step (4) to paper making, or to getting polysaccharide by enzymolysis Test Example 1 Experiment Method of Germination of Wheat Seed Soaking a certain quantity of wheat seeds with a certain concentration of humic acid solution for 4 hours in a culture dish, and adding an appropriate amount of water after filtering out the humic acid solution, and then culturing putting wheat seeds in an incubator under an appropriate temperature. Calculating the germination number every day, testing the germination potential on the third or fourth day, and testing the germination rate and the length of the seeding on the seventh day, and then getting the average value. The specific criterion and method for processing data are as follows. It is shown in formula (1-1), formula (1-2), formula (1-3).

Standard of the Seed Germination:

For long seed, the seed germination refers to a length of plumule being a half of length of seed For circular seed, the seed germination refers to a length of plumule being equivalent to a diameter of seed Seeds germination rate: (total number of germination/total seed number)×100% (measuring after 7 days)     formula (1-1)

Germination potential: (germination number after $n$ days/total seed number)×100% (measuring after $n$ days)     formula (1-2)

Germination index: $\Sigma Gt/t$ $Gt$: the germination number in the $t$-th day

Activity index: Germination index×hypocotyl length     formula (1-3)

TABLE 1

The influence of the humic acid on the germination of wheat seed (50 grain/dish, T = 22° C., germination potential on the 4th day)

| Samples | Germination potential (%) | Germination ratio (%) | Germination index | Plumule length | Activity index |
|---|---|---|---|---|---|
| Embodiment 1 | 91 | 90 | 28.94 | 7.68 | 221.55 |
| Comparison 1 | 73 | 75 | 22.32 | 5.67 | 186.45 |
| Embodiment 2 | 92 | 91 | 29.78 | 7.71 | 223.51 |
| Comparison 2 | 74 | 76 | 22.45 | 5.69 | 187.13 |
| Embodiment 3 | 93 | 92 | 29.91 | 7.85 | 224.64 |
| Comparison 3 | 75 | 75 | 22.49 | 5.73 | 168.56 |

Note: example 1, samples of embodiments 1-3 are the humic acid composition prepared by the method as embodiments 1-3 respectively. The comparison 1, 2 and 3 are the corresponding fulvic acid respectively. For example, in embodiment 1, the content of fulvic acid is 44.62 parts by weight in wheat straw, so, the sample of comparison 1 is fulvic acid with equivalent weight to the one of fulvic acid in the humic acid composition, and so on.

It is seen from the above test results that, compared with fulvic acid with equivalent amount, the humic acid composition stimulates stronger to the germination of wheat seed. In other words, compared with fulvic acid with equivalent amount, the humic acid composition of the present invention also contains a little content of brown and black humic acid, phenolic hydroxyl with high content in the humic acid composition, except for fulvic acid. And the humic acid composition has obviously stimulating function on seed germination. The humic acid composition can provide microbial organic source for soil directly, and improve the nutrient of crops and the soil environment in rhizosphere to promote the breeding of microorganism and delay the attenuation rate of soil microbes. Thus, the soil microbes can be kept exuberant life activities for a long time, so as to promote the growth and development of crops.

Test Example 2

1. Material and Method
1.1 Test Method

It is conducted a field experiment for two years of and a pot experiment for one year. The field experiment is conducted in an experimental field of Tai'an agriculture technology institution. The pot experiment is carried out in a net house. Experimental soil is taken from the same experimental field with the field experiment. And the experimental soil is aquic brown soil, and belongs to light soil. In the experimental soil, a content of organic matter content is 13.2 g/kg, a content of alkali solution nitrogen is 71.5 mg/kg, a content of rapidly-available phosphorus is 11.5 mg/kg, a content of rapidly-available potassium is 75.8 mg/kg, and pH 6.9.

The humic acid composition for testing is prepared by the method in embodiment 1. A biological activity fertilizer with the humic acid is manufactured by Tai'an agriculture technology institution as a comparation, (including humic acid of 21.0%, NPK of 16.0%, beneficial microbes ≥2.0×10.07 cfu/g). And other inorganic fertilizer contains urea (including N 46.0%). Wheat varieties: Taishan 241.

In experiment, it is provided basic application of the humic acid composition of embodiment 1 (sample) by 1500.0 kg/hm$^2$, and basic application of the biological activity fertilizer (comparison) containing the humic acid by 1500.0 kg/hm$^2$. For the field experiment, experimental plot is an area of 20.0 m$^2$, and the experiment is replicated for 4 times by random assortment, there are an isolation area with a width of 1.0 m between replication blocks, and planting around for guarding row. For the pot experiment, a pot has a height of 27.0 cm and a diameter of 30.0 cm, the experiment is replicated for 6 times by random assortment, and displaying around protective pot to eliminate the edge growth effect.

For the field experiment, sowing on Oct. 6, 2011, and harvesting on June, 3 in the next year; sowing seeds on Oct. 9, 20123, and harvesting on June 11 in the next year. For the pot experiment, sowing seeds on Oct. 10, 2012 and 2013, and harvesting on May 19 in the next year. In the field experiment, sowing wheat seeds with a weight of 15.0 g in each line after ditching, and basic seedlings is an amount of around 1.5 million/hm$^2$. In the pot experiment, each pot is filled with a doped soil with a weight of 11.5 kg which is sieved by a screen with opening of 0.5 cm, sowing 15 seeds, and planting 10 wheat seedlings. Single basic application is conducted in the field experiment, and urea fertilizer of 150.0 kg/hm$^2$ is applied in combination with watering at jointing stage in the next year. Soil is mixed with fertilizer in the pot experiment and soil mix, and urea fertilizer of 1.5 g/basin is applied in combination with watering at green period in the next year.

1.2 Researching the Determining Items

After wheat maturation, for each experimental plot of the field experiment, it is independently performed to harvest, thresh, dry, remove impurity, and weigh, and then agronomy properties are researched on the representative plant. At the jointing stage and the postulation period for the pot experiment, the microorganism quantity and the enzymatic activity are determined in the soil sample. The total quantity of microorganism is determined by the plate isolation method in $10^5$ cfu/g (dry soil). The urease activity is determined by the phenol sodium chlorate colorimetric method in $NH^3$—N mg/(g·d). The sucrose enzyme is determined by the 3,5-dinitrosalicylic acid colorimetric method in glucose mg/(g·d). The phosphatase activity is determined by disodium phenyl phosphate method in phenol mg/(g·d). The catalase activity is determined by potassium permanganate method in $KMnO_4$ mL/(g·d).

2. Results and Analysis
2.1 the Influence of Different Humic Acid on Wheat Growth and Yield
2.1.1 the Influence on Wheat Development Fixed-point investigation on the dynamic change of the wheat development in the field experiment during each fertilizing treatment, the results are shown in table 2.

TABLE 2 the influence of different humic acid treatment on the dynamic variation of the wheat development (average value of the field experiments for two years)

| Treatment | Basic seedlings (×10$^4$/hm$^2$) | Tiller number (×10$^4$/hm$^2$) | | | | | Percentage of earbearing tiller (%) |
| --- | --- | --- | --- | --- | --- | --- | --- |
| | | Before winter | Green stage | Booting stage | Maximum tiller | Effective tiller | |
| Comparison | 150.0 | 703.6 | 817.4 | 639.1 | 1545.1 | 471.0 | 30.5 |
| Sample | 150.0 | 671.8 | 814.6 | 666.7 | 1581.8 | 573.8 | 36.3 |

The results show that the tiller number before winter and at green stage by applying the humic acid composition as sample is similar with the ones by applying the biological activity fertilizer as comparison. From the maximum tiller of wheat, the fertilizer efficiency of the humic acid composition of the present invention is gradually shown. The tiller number at the booting stage, the effective tiller quantity and the percentage of earbearing tiller are all higher than the ones by applying the biological activity fertilizer as comparison. It can be seen from the dynamic analysis of the wheat development, that the humic acid composition of the present invention has the properties with promoting antecedent growth and controlling post growth, so that it is provided the nutrition condition for obtaining a high yield of wheat.

2.1.2 the Influence on the Property and Yield of Wheat Plant

The investigation results of difference treatment on the property and yield of wheat plant are shown in table 3

TABLE 3

The influence on the property and yield of wheat plant by the different treatment

| Treatment | Plant height (cm) | Length of wheatear (cm) | Internode length (cm) 1th | Internode length (cm) 2th | Anti fracture forces (g) | Flag leaf area (cm$^2$) | Secondary root (No.) | Wheatear number (×10$^4$/hm$^2$) | Gains per ear (No.) | 1000-gains weight (g) |
|---|---|---|---|---|---|---|---|---|---|---|
| Comparison | 70.6 | 8.7 | 4.2 | 7.2 | 251.1 | 33.8 | 29.4 | 471.1 | 35.6 | 49.7 |
| Sample | 71.8 | 9.5 | 4.9 | 7.8 | 281.5 | 37.7 | 35.5 | 516.3 | 43.9 | 55.8 |

It can be seen from the above results, compared with the biological activity fertilizer as comparison, there is an improvement with difference degrees in all of aspects such as length of wheatear, flag leaf area and secondary root, with the exception of plant height. Thus, the property of wheat plant meets more the requirements for high yield.

2.1.3 the Influence on Wheat Yield

The results of the wheat yields with difference treatment are shown in table 4.

TABLE 4 the influence on wheat yield by different treatment (average value of the field experiment for two years)

| Treatment | Yield in each plot I | II | III | IV | Average | Yield (kg/hm$^2$) | Yield increase compared to the comparison (kg/hm$^2$) | (%) |
|---|---|---|---|---|---|---|---|---|
| Comparison | 14.06 | 13.69 | 13.21 | 13.20 | 13.54 | 6774.0 | — | — |
| Sample | 17.73 | 16.97 | 16.97 | 16.96 | 17.16 | 7981.9 | 1107.9 | 17.8 |

It can be seen from the above results, the yield by applying the humic acid composition of the present invention is higher than the one by applying the biological activity fertilizer as comparison by 17.8% under almost similar condition on applying the inorganic nutrients. The organic, inorganic nutrients and microbial in the humic acid composition of the present invention play a positive role in wheat yield.

2.2 the Influence on the Microbial Activity in Soil

Soil microorganism and enzyme activity are the important index of soil fertility. The number of bacteria, fungi and actinomycetes are determined at the jointing stage and the postulation period for the pot experiment, the results are shown in table 5.

TABLE 5

The influence on the quantity of soil microorganism by different treatments (pot experiment)

| Test stage | Treatment | Bacteria (×10$^5$ cfu/g, DW) | Fungus (×10$^5$ cfu/g, DW) | Actinomyces (×10$^5$ cfu/g, DW) |
|---|---|---|---|---|
| Jointing stage | Comparison | 15.09 | 2.95 | 3.65 |
| stage | Sample | 20.76 | 3.95 | 4.86 |

TABLE 5-continued

The influence on the quantity of soil microorganism by different treatments (pot experiment)

| Test stage | Treatment | Bacteria (×10$^5$ cfu/g, DW) | Fungus (×10$^5$ cfu/g, DW) | Actinomyces (×10$^5$ cfu/g, DW) |
|---|---|---|---|---|
| Postulation period | Comparison | 11.72 | 1.63 | 2.77 |
| | Sample | 17.62 | 2.67 | 4.18 |

It can be seen from the number attenuation of soil microorganism from the jointing stage to the postulation period that bacteria are attenuated by 22.3%, and funguses are attenuated by 44.7%, and actinomycetes are attenuated by 24.1% by applying the humic acid as comparison. Bacteria are attenuated by 15.1%, funguses are attenuated by 32.4%, and actinomycetes are attenuated by 14.0% by applying the humic acid composition of the present invention. It indicates that the humic acid composition can increase the quantity of soil microorganism significantly, and also keep the microorganism in high biological activity.

2.3 Influence of the Humic Acid on the Enzyme Activity in Soil

The result of the enzyme activity in soil is shown at jointing stage of the pot experiment in table 6.

TABLE 6

The influence of different fertilizing treatments on the enzyme activity in soil

| Treatment | Urease [$NH^3$—N mg/(g · d)] | Sucrase glucose mg/(g · d)] | Phosphatase [phenol mg/(g · d)] | Catalase [$KMnO_4$ mL/(g · d)] |
|---|---|---|---|---|
| Comparison | 4.82 | 0.88 | 3.47 | 14.59 |
| Sample | 7.16 | 1.57 | 4.78 | 19.79 |

It can be seen from the above results, compared with the treatment with the humic acid as comparison, urease is increased by 2.34 mg/$NH_3$—N(g·d), sucrase is increased by glucose 0.69 mg/(g·d), phosphatase is increased by 1.31 phenol mg/(g·d), and catalase is increased by 5.2 $KMnO_4$ mL/(g·d) by applying the humic acid composition of the present invention. It is indicated that the humic acid composition of the present invention is helpful to enhance the urease activity, and improve the efficiency of nitrogen element in soil. It is a result by providing more enzymatic substrate, such as enhancing the sucrase activity, speeding up the transformation of organic matter in soil, enhancing the activity of phosphatase in soil, enhancing the transformation and release of organic phosphorus in soil to improve the nutrition level of phosphor element in crop, and improving the activity of catalase, thus, the normal activity of soil microorganisms is effectively protected.

The experiment is carried out on the humic acid compositions prepared in the other embodiments, the obtained results are similar with the foresaid.

What is claimed is:

1. A humic acid composition, comprising fulvic acid, ulmic acid and black humic acid, wherein, fulvic acid is in an amount ranging from 64% to 98 wt % based on a sum weight of fulvic acid, ulmic acid and black humic acid, and a content of phenol hydroxyl groups is in a range from 0.76 mmol/g to 2.42 mmol/g in the humic acid composition.

2. The humic acid composition according to claim 1, wherein the content of phenol hydroxyl groups is in a range from 1.12 mmol/g to 2.21 mmol/g in the humic acid composition.

3. The humic acid composition according to claim 1, wherein a total content of acidic groups is in a range from 0.76 mmol/g to 2.94 mmol/g in the humic acid composition.

4. The humic acid composition according to claim 2, wherein a total content of acidic groups is in a range from 0.76 mmol/g to 2.94 mmol/g in the humic acid composition.

5. The humic acid composition according to claim 3, wherein the total content of acidic groups is in a range from 1.12 mmol/g to 2.89 mmol/g.

6. The humic acid composition according to claim 4, wherein the total content of acidic groups is in a range from 1.12 mmol/g to 2.89 mmol/g.

7. The humic acid composition according to claim 1, wherein, a total humic acid is in an amount ranging from 25 parts to 65 parts by weight of the humic acid composition.

8. The humic acid composition according to claim 1, wherein, a total humic acid is in an amount ranging from 25 parts to 55 parts by weight of the humic acid composition.

9. The humic acid composition according to claim 1, wherein, organic material is in an amount ranging from 35 parts to 55 parts by weight of the humic acid composition.

10. The humic acid composition according to claim 7, wherein, water-soluble matter is in an amount ranging from 80 parts to 105 parts by weight of the humic acid composition.

11. The humic acid composition according to claim 9, wherein, water-soluble matter is in an amount ranging from 80 parts to 105 parts by weight of the humic acid composition.

12. The humic acid composition according to claim 1, wherein, sodium ions are in an amount ranging from 4.05 mmol/g to 4.85 mmol/g, or potassium ions are in an amount ranging from 8.53 mmol/g to 11.23 mmol/g in the humic acid composition.

13. The humic acid composition according to claim 2, wherein, sodium ions are in an amount ranging from 4.05 mmol/g to 4.85 mmol/g, or potassium ions are in an amount ranging from 8.53 mmol/g to 11.23 mmol/g in the humic acid composition.

14. The humic acid composition according to claim 3, wherein, sodium ions are in an amount ranging from 4.05 mmol/g to 4.85 mmol/g, or potassium ions are in an amount ranging from 8.53 mmol/g to 11.23 mmol/g in the humic acid composition.

15. The humic acid composition according to claim 1, wherein, sodium ions are in an amount ranging from 0.20 mmol/g to 0.31 mmol/g, potassium ions are in an amount ranging from 0.84 mmol/g to 1.43 mmol/g, and ammonium ions are in an amount ranging from 3.57 mmol/g to 8.07 mmol/g in the humic acid composition.

16. The humic acid composition according to claim 2, wherein, sodium ions are in an amount ranging from 0.20 mmol/g to 0.31 mmol/g, potassium ions are in an amount ranging from 0.84 mmol/g to 1.43 mmol/g, and ammonium ions are in an amount ranging from 3.57 mmol/g to 8.07 mmol/g in the humic acid composition.

17. The humic acid composition according to claim 3, wherein, sodium ions are in an amount ranging from 0.20 mmol/g to 0.31 mmol/g, potassium ions are in an amount ranging from 0.84 mmol/g to 1.43 mmol/g, and ammonium ions are in an amount ranging from 3.57 mmol/g to 8.07 mmol/g in the humic acid composition.

18. The humic acid composition according to claim 1, wherein, fulvic acid is in an amount ranging from 81% to 98 wt % based on a sum weight of fulvic acid, ulmic acid and black humic acid.

19. The humic acid composition according to claim 1, wherein, fulvic acid is in an amount ranging from 85% to 98 wt % based on a sum weight of fulvic acid, ulmic acid and black humic acid.

20. A humic acid fertilizer, soil amendment or plant growth stimulin comprising the humic acid composition according to claim 1.

* * * * *